3,149,999
PROCESS FOR TREATING TEXTILES
Heinz Werner Enders, Stadtbergen, near Augsburg, Rolf Zorkendorfer, Augsburg, and Gunter Pusch, Stadtbergen, near Augsburg, Germany, assignors to Chemische Fabrik Pfersee G.m.b.H., Augsburg, Germany, a firm of Germany
No Drawing. Filed July 31, 1961, Ser. No. 127,904
Claims priority, application Germany Sept. 22, 1960
6 Claims. (Cl. 117—139.4)

This invention relates to compositions for treating textile fibers and refers more particularly to compositions for making crease resistant fabrics of cellulose fibers or regenerated cellulose fibers.

In prior art acetal resins were used for the treatment of textiles. Acetal resins are reaction products of mono- or dialdehydes, particularly formaldehyde or glyoxal, with mono- or polyvalent aliphatic alcohols. Their use was found advantageous for textile treatment since acetal resins do not retain chlorine. Textiles treated with certain other synthetic resins become brown or are otherwise damaged by ironing after they have been treated during washing with substances splitting off chlorine or with chlorine-containing water. It should be noted that chlorine is absorbed by synthetic resins containing amino groups which are used for textile treatment, whereupon chlorine is split off during ironing. On the other hand, since acetal resins have no nitrogen, they do not retain chlorine. However, acetal resins have the drawback that their capacity of rendering textile fabrics crease resistant is considerably less than that of nitrogen-containing resins.

An object of the present invention is to eliminate the drawbacks of prior art textile-treating compositions.

Other objects will become apparent in the course of the following specification.

The present invention is based in part on the surprising discovery that when acetal resins are added to a mixture of certain nitrogen-containing resins, the capacity of this composition of retaining chlorine is diminished to a much greater extent than could be expected, while, on the other hand, the faculty of the nitrogen-containing resins to render fabrics crease-resistant is diminished to a much lesser extent than could be expected.

It was found advisable to use in such mixture of nitrogen-containing resins etherified methylol compounds of aminotriazines especially penta- or hexamethylolmelamines which are largely etherified in the methylol groups by monovalent alcohols with 1 to 3 C-atoms, along with dimethylol compounds of alkylene ureas having an alkylene radical of 2 to 3 carbon atoms, particularly ethylene urea. It is also possible to partly replace etherified methylol melamines, which can be substituted by corresponding compounds of other aminotriazines, such as ammeline, etc., by triazone resins which are dimethylol compounds of 1-alkyl-4-oxo-hexahydro-1,3,5-triazines. These compounds are described, for example, in Patent No. 2,901,463 to Hurwitz.

It is sufficient to add acetal resins in an amount of 10% of the other resins; however, it is possible to increase this amount to 40% and yet obtain good crease resistance.

The amounts of the individual resins can also vary within certain limits. As already stated, the amounts of acetal resins may vary from 10% to 40%, 20% being preferred; the amounts of dimethylol alkylene ureas may vary from 40% to 70%, 55% being preferred; and the amounts of etherified methylolaminetriazines may vary from 10% to 30%, 25% being preferred. The compositions are preferably made in form of aqueous solutions containing more than 50% of the non-volatile compounds.

The acetal resins, which are known in themselves, may be prepared by heating a polyhydric alcohol with formaldehyde or glyoxal in the presence of an acid or of an acid generating compound. When formaldehyde is to be used, it is preferably added to the reaction mixture in the form of paraformaldehyde, and the acetal is formed in the presence of an acid or an acid generating compound while the water formed by the acetal condensation is removed by distillation.

Glyoxal is preferably employed in the form of the commercially available 30 percent solution in water.

The polyhydric alcohols employed are preferably of the formula $$C_nH_{2n+2}O_m$$

wherein $n$ is an integer between two and six, and $m$ is an integer between 2 and 6, but not greater than $n$, and preferably alcohols of the formula $$HO[CH_2—(CHOH)_x—CH_2O]_yH$$

wherein $x$ is zero or one, and $y$ is an integer between two and four.

Polyhydric alcohols of the above formulas include ethylene glycol, glycerol, pentaerythritol, hexitol, diglycol, triglycol, diglycerol, propylene glycol, butylene glycol, and the like.

It is preferred to employ alcohols of the first-mentioned formula wherein $n=m$, diglycol, and triglycol.

The ratio of aldehydes and alcohols in the preparation of acetal resins is preferably selected to combine one mol equivalent of functional aldehyde radicals with two mol equivalents of alcoholic hydroxyl groups.

The acid catalysts or acid generating catalysts employed are preferably non-volatile, strong, inorganic acids such as sulfuric acid and phosphoric acids, or salts of multivalent hydrolyzable cations such as magnesium with strong inorganic acids. Magnesium chloride is a preferred catalyst.

The term "etherified methylol compounds of aminotriazines with monovalent alcohols" will be understood to refer to compounds which are derivatives of aminotriazines having at least two amino radicals bound to the triazine ring. The methylol aminotriazines preferably contain at most one hydrogen atom attached to a nitrogen atom of the amino groups, i.e. all other hydrogen atoms attached to nitrogen atoms of the amino groups are replaced by methylol radicals. The monovalent alcohols referred to will be understood to be methanol, ethanol, propanol and isopropanol. At least 30%, preferably more than 50%, of the methylol radicals of the aminotriazine derivatives are etherified with the said monovalent alcohols.

The preferred ethers for the present invention are derivatives of penta- and hexamethylol melamine.

The afore-mentioned ethers are prepared according to known methods, such as the reaction of the corresponding methylol aminotriazines with the alcohols in an aqueous or non-aqueous medium and using strong inorganic acids as catalysts. The preferred starting materials are the anhydrous methylol compounds.

The dimethylol compounds of the alkylene ureas having alkylene radicals of two to three carbon atoms will be understood to be derived from N,N'-alkylene ureas, and particularly from N,N'-ethylene urea.

The dimethylol compounds of the 1-alkyl-4-oxo-hexahydro-1,3,5-triazines (N-alkyl-triazones) have an alkyl radical of one to six carbon atoms, and preferably of one to two carbon atoms. When dimethylol triazones are jointly employed (with methylol aminotriazines), not more than 50 percent of the etherified methylol aminotriazines present in the mixture should be replaced by these dimethylol triazones.

In use it is possible to mix the individual resins and then prepare the textile treating bath, while it is also possible to dissolve the resins separately in the bath.

As hardening agents for the resin mixtures are particularly suitable magnesium chloride, zinc chloride or zinc nitrate. Magnesium salt (with 6 mols crystal water) is used in an amount of 30% to 40% by weight calculated on the basis of a 100% resin mixture, while zinc salts are used in corresponding amounts of 20% to 35%.

The concentration used for textile treatment amounts to 30 gr. to 100 gr. especially to 50 gr. to 80 gr. of a 100% resin mixture per one liter of the bath. The treatment is carried out in the usual manner known in the art. It is advisable to carry out the condensation at a temperature range of about 130° C. to 180° C. within a time of 15 to 1 minute.

When the condensation reaction is performed at temperatures lower than 130° C. there is some risk that the finishing agent may not be completely cured on the fibrous material. An incomplete cure not only affects the performance permanence of the finish when subjected to repeated laundering, but it may also cause chlorine retention. When the condensation reaction is performed at temperatures above 180° C., the textile material treated may readily suffer heat damage at such elevated temperatures.

The resin mixture constituting the subject of the present invention is particularly suitable for the treatment of natural cellulose fibers.

The following examples are given by way of illustration only. The parts given are parts by weight.

The acetal resins may be prepared in the manner illustrated by the following examples:

A. 106 parts of ethylene diglycol are mixed with 30 parts of paraformaldehyde and 0.5 part of magnesium, chloride hexahydrate or 0.2 part by volume of concentrated sulfuric acid in a flask equipped with a reflux condenser. The mixture is refluxed for ten minutes. The reflux condenser is then replaced by a descending condenser and the temperature is gradually raised to about 160° C. while 16.2 parts of water are distilled off. As soon as the desired amount of water is driven off, the flask is cooled to room temperature and its contents are adjusted to a pH value of 6.8 to 7.2 by means of 25 percent sodium hydroxide solution.

B. 62 parts of ethylene glycol are reacted with 30 parts paraformaldehyde in the same manner as in Example A, whereby 18 parts of water are distilled off, and the reaction mixture is neutralized.

C. In a flask of the type employed in Example A, 136 parts of pentaerythritol, 60 parts paraformaldehyde, 80 parts water, 1 part magnesium chloride hexahydrate or 0.4 part (by volume) concentrated sulfuric acid are refluxed five minutes, and 36 parts of water are then distilled off. After cooling, the reaction mixture is adjusted to a pH of approximately 7.0 with 20 percent potassium hydroxide.

D. 60 parts glyoxal are dissolved in 124 parts ethylene glycol together with 5 parts magnesium chloride hexahydrate or one part (by volume) of concentrated sulfuric acid by heating the mixture to about 60° C. on a water bath. The mixture is adjusted to a pH value of about 7 with 30 percent sodium hydroxide solution, and then diluted with an equal amount of water.

E. 182 parts of sorbitol are reacted with 60 parts paraformaldehyde, 90 parts water and one part of magnesium chloride or 0.4 part of concentrated sulfuric acid. The reaction mixture is refluxed for ten minutes and 40 parts of water are then distilled off. After cooling to room temperature, the reaction mixture is adjusted to a pH value of approximately 7.2 with 30 percent potassium hydroxide solution.

*Example 1*

An aqueous solution containing 50 percent solids is produced, the solids consisting of 50 percent dimethylol-ethylene urea, 25 percent hexamethylol melamine etherified 80% with methanol, and 25 percent of the product of Example A. The several solid components are mixed in the form of their 50 percent aqueous solutions. A textile treating bath is prepared by dissolving 24 gr. magnesium chloride hexahydrate in 200 milliliters water, adding 160 gr. of the aforementioned solution containing 50 percent solids, and diluting to one liter.

A mercerised cotton poplin is soaked with this solution and the excess liquid squeezed to a pick-up of about 80%. The textile material is then dried at about 100° C. and cured at 150° C. for 4 minutes.

The poplin has a crease angle of 130° in the warp and 127° in the weft. After five washings at the boil the crease angle is reduced to 129° in the warp and to 125° in the weft. The loss in tensile strength after 5 washings at the boil and a chlorine treatment according to AATCC after each washing is after the Scorch Test at 185° C. only 6%. In this case there is no yellowing of the material.

*Example 2*

A mixture is prepared from 70 parts by weight of dimethylol-ethylene-urea, 15 parts by weight of hepta-methylolmelamine which methylol groups are etherified at about 70% with ethanol and 15 parts by weight of an acetal compound produced from one mol of pentaerythrite and two mols of formaldehyde according to C, each product in form of a 50% aqueous solution. 120 gr. of this mixture are dissolved along with 14 gr. of zinc chloride in one liter of water.

A fabric treated in the manner described in Example 1 was found to have a crease angle of 128° in the warp and 126° in the weft. After five washings at the boil the crease angles remain substantially unchanged, namely, 126° for the warp and 125° for the weft.

The diminution of tensile strength determined in the manner set forth in Example 1, amounted to 10%. There was no yellowing of the goods.

*Example 3*

A bath is produced by dissolving therein 55% of dimethylol-ethylene-urea, 15% of hexamethylolmelamine ether (about 80% of the methylol groups are etherified by methanol), 10% of dimethylol N-ethyl-triazone and 20% of an ethylene-glycol-formaldehyde-acetal according to B in such manner that all the substances are contained in the bath at the ratio of 70 gr. per liter. Additionally 14 gr. of zinc-nitrate-hexahydrate are dissolved per liter of bath and an unmercerised cotton reenforce fabric is treated in the bath in the manner set forth in the preceding examples.

The fabric had a crease angle of 133° in the warp and 131° in the weft. After a five time washing at the boil the crease angles were 130° in the warp and 130° in the weft. The diminution of tensile strength amounted only to 7% and there was no yellowing of the goods.

*Example 4*

When the hexamethylol melamine etherified with methanol and the dimethylol-N-ethyl triazone are replaced by 25 percent of hexamethylol melamine etherified with methanol, while otherwise operating in the same manner as in Example 3, there is obtained a textile material which has properties largely similar to those of the material obtained in Example 3.

*Example 5*

42 parts of dimethylol propylene urea are mixed with 28 parts of a hexamethylol melamine etherified 75% with ethanol, and with 30 parts of the product of Example A, each ingredient being incorporated in the mixture in the form of its 50 percent aqueous solution.

150 gr. of this mixture together with 17 gr. magnesium chloride and 3 gr. citric acid are dissolved in 700 milliliter water and additional water is added to bring the total volume to one liter.

A cotton poplin is saturated with the resulting treating bath, it is squeezed to a pick-up of 80 percent, dried at 100° C. and the resin is cured by condensation at 140° C. for eight minutes.

The cotton fabric has a crease angle of 130° in the warp and of 128° in the weft. After being laundered five times at a boil, the crease angle of the fabric in the warp is reduced only to 127°, and in the weft only to 125°.

The loss in tensile strength after the chlorine retention test described in Example 1 is only 5 percent.

*Example 6*

60 parts dimethylol-ethylene-urea, 20 parts of a pentamethylol melamine etherified 65 percent with propanol, and 20 parts of the product of Example E are mixed in the form of their respective aqueous solutions containing 60 percent solids.

120 gr. of this mixture and 20 gr. zinc nitrate are jointly dissolved in water and the total volume is adjusted to one liter. A twill of rayon staple fibers is saturated with the solution, is squeezed to a pick-up of 95 percent, dried at about 110° C., and the resin finish is cured by condensation at 155° C. for three minutes. The average crease angle is 135° and is reduced by five launderings at the boil only to 119°. No measurable loss in tensile strength is caused by the laundry treatment.

The 20 parts of the product of Example E may be replaced in the above example by equal amounts of the product of Example D, and five of the 20 parts of etherified pentamethylol melamine may be replaced by five parts of dimethylol-N-methyl-triazone, all constituents being added to the mixture in the form of their aqueous 60 percent solutions. The results obtained in the treatment of textile material by the modified composition largely correspond to those described above.

It is apparent that the examples described above have been given solely by way of illustration and not by way of limitation and that they are subject to many variations and modifications within the scope of the present invention. All such variations and modifications are to be included within the scope of the present invention.

What is claimed is:

1. A process for rendering textiles crease-resistant comprising the steps of treating the textiles in a liquid bath consisting of 30 gr. to 100 gr. of a mixture of 10% to 40% by weight of an acetal resin with 40% to 70% of a dimethylolalkylene urea wherein the alkylene radical has 2 to 3 carbon atoms and 10% to 30% of a methylolaminotriazine of aminotriazines having at least two amino groups attached to the triazine ring, the aminotriazine having at most one unsubstituted hydrogen attached to a nitrogen of the amino groups and which methylolaminotriazine is etherified with an aliphatic saturated alcohol of 1 to 3 carbon atoms and of a metal salt selected of the group consisting of salts of magnesium and zinc with strong, inorganic acids, squeezing the textile to remove excess liquid, drying the textile, and curing the textile at a temperature between 130° C. to 180° C., said acetal resin having been obtained by reacting a compound selected from the group consisting of hydroxy derivatives having the formula $$C_nH_{2n+2}O_m$$

wherein $n$ is a whole number between 2 and 6, $m$ is a whole number between 2 and 6 and not more than $n$, and of the formula $$HO[CH_2-(CHOH)_x-CH_2O]_yH$$

wherein $x$ is 0 and 1, $y$ is .2 to 4 and an aldehyde selected of the group consisting of formaldehyde and glyoxal.

2. A process in accordance with claim 1, wherein the metal salt is magnesium chloride hexahydrate in an amount of 30% to 40% in respect to the amount of the mixture of acetal resin and methylol derivatives.

3. A process in accordance with claim 1, wherein the metal salt is selected from the group consisting of zinc chloride and zinc nitrate in an amount of 20% to 35% in respect to the amount of the mixture of acetal resin and methylol derivatives.

4. A process for rendering textiles crease-resistant comprising the steps of treating the textiles in a liquid bath consisting of 30 gr. to 100 gr. of a mixture of 10% to 40% by weight of an acetal resin with 40% to 70% of a dimethylolalkylene urea wherein the alkylene radical has 2 to 3 carbon atoms and 10% to 30% of a composition of a methylolaminotriazine of aminotriazine having at least two amino groups attached to the triazine ring, the aminotriazine having at most one unsubstituted hydrogen attached to a nitrogen of the amino groups and which methylolaminotriazine is etherified with an aliphatic saturated alcohol of 1 to 3 carbon atoms and a dimethylol-1-alkyl-hexahydro-4-oxo-1,3,5-triazine, the alkyl radical has 1 to 6 carbon atoms which composition consists at least of 50% of the etherified methylolaminotriazine and of a metal salt selected of the group consisting of salts of magnesium and zinc with strong, inorganic acids, squeezing the textile to remove excess liquid, drying the textile, and curing the textile at a temperature between 130° C. to 180° C., said acetal resin having been obtained by reacting a compound selected from the group consisting of hydroxy derivatives having the formula $$C_nH_{2n+2}O_m$$

wherein $n$ is a whole number between 2 and 6, $m$ is a whole number between 2 and 6 and not more than $n$, and of the formula $$HO[CH_2-(CHOH)_x-CH_2O]_yH$$

wherein $x$ is 0 and 1, $y$ is .2 to 4 and an aldehyde selected of the group consisting of formaldehyde and glyoxal.

5. A process in accordance with claim 4, wherein the metal salt is magnesium chloride hexahydrate in an amount of 30% to 40% in respect to the amount of the mixture of acetal resin and methylol derivatives.

6. A process in accordance with claim 4, wherein the metal salt is selected from the group consisting of zinc chloride and zinc nitrate in an amount of 20% to 35% in respect to the amount of the mixture of acetal resin and methylol derivatives.

References Cited in the file of this patent

UNITED STATES PATENTS

| | | |
|---|---|---|
| 2,339,203 | Stiegler et al. | Jan. 11, 1944 |
| 2,901,463 | Hurwitz | Aug. 25, 1959 |
| 3,015,584 | Reinhardt et al. | Jan. 2, 1962 |